March 23, 1943.  B. E. SUMMERS  2,314,525
GARDEN HOSE SPRINKLER
Filed Nov. 8, 1940
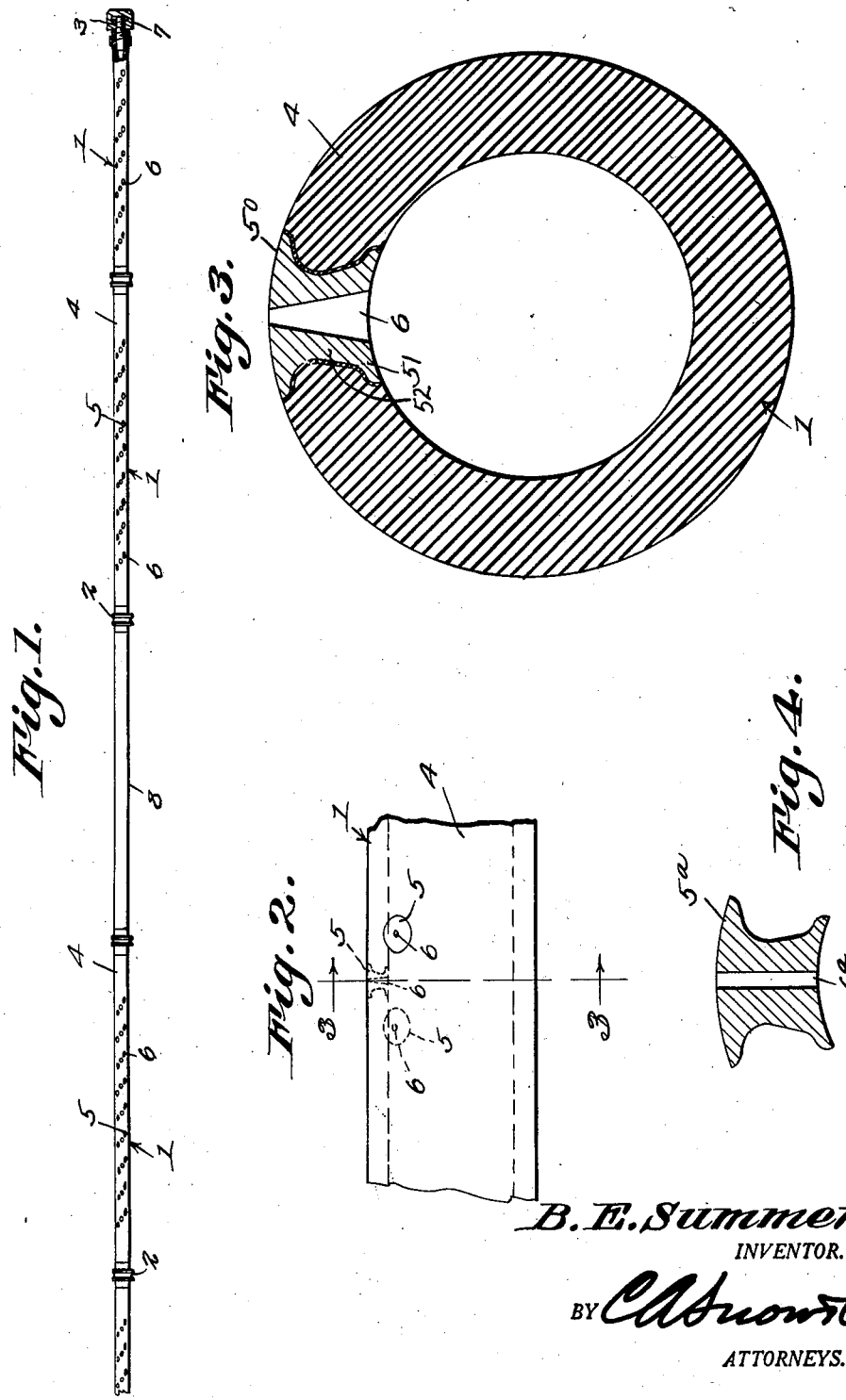
B. E. Summers
INVENTOR.
BY
ATTORNEYS.

Patented Mar. 23, 1943

2,314,525

UNITED STATES PATENT OFFICE 2,314,525

GARDEN HOSE SPRINKLER

Berl Edwin Summers, Denver, Colo., assignor of one-half to Darwin Da Volt, Denver, Colo.

Application November 8, 1940, Serial No. 364,933

1 Claim. (Cl. 299—104)

This invention aims to provide a garden hose, so constructed that proper irrigation or sprinkling may be provided at places where such operations are required, the construction being such that the hose can be dragged about without being unduly worn, and novel means being supplied whereby water will be discharged laterally from the hose, with increased velocity, the perforation of the hose to secure lateral discharge working no appreciable weakening in the hose.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in top plan, a hose conduit wherein the present invention is embodied;

Fig. 2 is a fragmental side elevation on an enlarged scale;

Fig. 3 is a transverse section on the line 3—3 of Fig. 2;

Fig. 4 is a fragmental cross section showing a modification.

In carrying out the invention, there is provided a hose section 1, made of flexible material, as is common in garden hose. Each hose section 1 is supplied at one end with a threaded female coupling 2, and at the opposite end with a threaded male coupling 3.

The hose section comprises a body 4, and transverse nozzles 5 in the body. The nozzles 5 are held in the body 4 by a coating of retaining material 50, such as cement or a vulcanizable substance, which serves also to prevent the hose body from rotting around the nozzles. The nozzles 5 may be made of brass, copper or any other suitable metal. The nozzles 5 have longitudinal bores 6, the inner and outer end portions of each nozzle being flush, respectively, with the inner and outer surfaces of the hose section. This detail prevents the hose from catching on anything, when it is dragged about, and it also prevents the flow of water through the hose from being impeded.

The hose section is further characterized by the fact that the end portions of the nozzles are enlarged heads, strengthening the general construction, and affording an increased, wear-resisting, metal area on the outer surface of the hose section.

The bores 6 have an outward taper, to increase the velocity of discharge, and to increase the range.

The hose section is further characterized by the fact that the nozzles 5 are arranged in longitudinal lines, the nozzles of adjacent lines being staggered, longitudinally of the hose, to prevent a weakening of the hose. All of the nozzles 5 are located in the upper portion of the hose section, well above a horizontal plane passing through the longitudinal axis of the hose section, to the end that the discharged water may not scour away the soil. The nozzles 5 of the central line discharge upwardly and vertically, the nozzles of the remaining lines discharging upwardly, but with a lateral inclination. This construction promotes a thorough distribution of the discharged water.

In Fig. 4, parts are marked by numerals already used, with the suffix a. The bores 6a may be of uniform cross section instead of tapered, and of any desired diameter.

The hose sections 1 may be joined together, end to end, by means of the couplings 2—3. The end of the hose section 1 most remote from the source of water supply, is closed by a cap 7, mounted on the corresponding male coupling element 3 and holding pressure, so that the water will be discharged through the bores 6 of the nozzles 5. The hose sections 1 need not be joined together, end to end, since, wherever desired, one or more imperforate sections 8 may be interposed. The operator, therefore, can effect the lateral irrigation or sprinkling wherever it is needed, as the complete conduit lies on the ground or is supported otherwise. If desired, but not necessarily, the hose sections 1 may be about ten feet long, and the nozzles 5 may be spaced apart lengthwise of the section by a distance of four inches, more or less, these dimensions being illustrative and not mandatory.

The nozzles 5 have inner and outer end flanges 51 and 50, respectively. The outer flanges 50 are of larger diameter than the inner flanges 51. Owing to this construction, the outer flanges 50 present a large surface to take wear when the hose is dragged over the ground, and, at the same time, a minimum amount of material has to be removed from the hose adjacent to the passage of the hose. Moreover, because the flanges 51 are smaller than the flanges 50, the flanges 51 can the more readily be forced through the holes that are made in the hose for the reception of the nozzles.

The outer end surfaces of the outer flanges 50 are convexed to conform to the transverse, external surface of the hose, and are flush therewith. This causes the flanges 50 to be the more effective to take wear, yet they will not catch on obstacles as the hose is drawn along. The inner end surfaces of the inner flanges 51 are concaved to conform to the cross sectional surface of the passage of the hose, and are flush with that surface, the flow of water through the hose being promoted.

The nozzles 5, throughout their length, are of such diameter that the bore may have a pronounced taper, as shown in Fig. 3, and still leave a thick, strong and substantial connecting portion 52 joining the flanges 50 and 51, the strong connecting portion being of peculiar utility whilst the nozzle 5 is being forced to place.

The device is simple in construction, but will be found thoroughly advantageous in use, and capable of consummating the objects set forth in the opening portion of this specification. The nozzles 5 not only effect a lateral discharge of water, but, as well, may strengthen the hose section and enable it to withstand the wear which is imposed upon it, due to the fact that it is likely to be dragged longitudinally on the ground, to and from the place of use.

The nozzles 5 are located close together and occupy an area extended approximately half way around the hose and throughout the major portion of the length of the hose. On this account, and because the outer surfaces of the outer flanges are of such diameter as to afford practical wear-resisting surfaces, the wear comes, to a large extent, on the outer end flanges of the nozzles, rather than upon the body of the hose.

The outlet ends of the bores of the nozzles are of small diameter compared with the diameter of the outer surfaces of the outer flanges, thereby to reduce those surfaces to a minimum extent. The cap 7 on one end of the hose constitutes a handle by which the hose may be prevented from rotating, and, consequently, the wear-resisting area afforded by the outer end flanges of the nozzles may be kept in contact with the ground.

Having thus described the invention, what is claimed is:

A garden hose comprising a straight flexible body, adapted to be dragged endwise on the ground, to and from a place of use, and transverse nozzles in the body, the nozzles being located close together and occupying an area extended approximately half way around the hose and throughout the major portion of the length of the hose, the nozzles having longitudinal bores; the nozzles having inner and outer end flanges, the outer flanges being of larger diameter than the inner flanges and of such diameter as to afford practical wear-resisting surfaces when the hose is dragged endwise, the outer end surfaces of the outer flanges being convexed to conform to the transverse, external surface of the hose, and being flush with that surface, the inner end surfaces of the inner flanges being concaved to conform to the cross sectional surface of the passage of the hose, and being flush with that surface; the outlet ends of the bores being of small diameter compared with the diameter of the outer surfaces of the outer flanges, thereby to reduce those surfaces to a minimum extent, and a cap on one end of the hose and constituting a handle by which the hose may be prevented from rotating and carrying the wear-resisting surfaces of the outer flanges out of contact with the ground.

BERL EDWIN SUMMERS.